Figure 1:
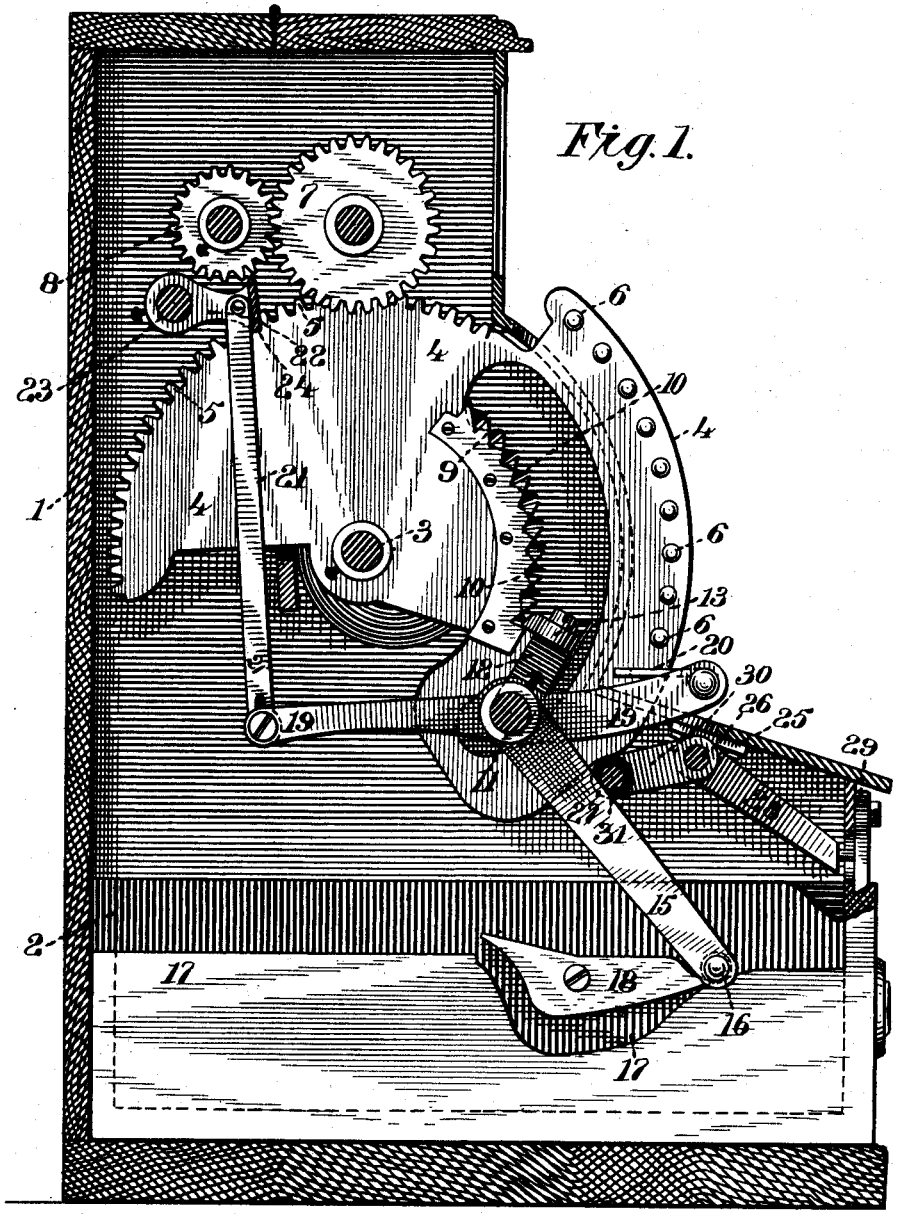

(No Model.) 6 Sheets—Sheet 1.

F. L. FULLER & G. H. GRISWOLD.
CASH INDICATOR.

No. 420,555. Patented Feb. 4, 1890.

Witnesses
Wm. F. Tanner
A. J. Tanner

Inventors
Frederick L. Fuller
George H. Griswold
by their attorney
D. H. Hubbard (No Model.) 6 Sheets—Sheet 3.

F. L. FULLER & G. H. GRISWOLD.
CASH INDICATOR.

No. 420,555. Patented Feb. 4, 1890.

Witnesses
Wm. J. Tanner
A. J. Tanner

Inventors
Frederick L. Fuller
George H. Griswold
by their attorney
S. H. Hubbard (No Model.) 6 Sheets—Sheet 4.

F. L. FULLER & G. H. GRISWOLD.
CASH INDICATOR.

No. 420,555. Patented Feb. 4, 1890.

Witnesses
Inventors
Frederick L. Fuller
George H. Griswold
by their attorney (No Model.) 6 Sheets—Sheet 6.

F. L. FULLER & G. H. GRISWOLD.
CASH INDICATOR.

No. 420,555. Patented Feb. 4, 1890.

Witnesses
Wm. J. Tanner
A. J. Tanner

Inventors
Frederick L. Fuller
George H. Griswold
by their attorney
D. H. Hubbard

UNITED STATES PATENT OFFICE.

FREDERICK L. FULLER AND GEORGE H. GRISWOLD, OF WATERBURY, CONNECTICUT, ASSIGNORS TO THE UNION CASH REGISTER COMPANY, OF TRENTON, NEW JERSEY.

CASH-INDICATOR.

SPECIFICATION forming part of Letters Patent No. 420,555, dated February 4, 1890.

Application filed October 31, 1889. Serial No. 328,823. (No model.)

*To all whom it may concern:*

Be it known that we, FREDERICK L. FULLER and GEORGE H. GRISWOLD, citizens of the United States, residing at Waterbury, in the county of New Haven and State of Connecticut, have invented certain new and useful Improvements in Cash-Registers; and we do hereby declare the following to be a full, clear, and exact description of the invention, such as will enable others skilled in the art to which it appertains to make and use the same.

Our invention relates to certain new and useful improvements in cash-indicators; but more particularly to machines substantially such as are shown and described in a certain pending application for Letters Patent, Serial No. 305,961, filed April 4, 1889, by the applicants herein named.

The object of our present invention is to amplify and improve in various respects upon the construction shown in the application above referred to, but particularly to provide a stop whereby the mechanism for indicating may be automatically locked when the operating handle or segment has been depressed to the proper distance to furnish a duplex system of locking-teeth for the segments, whose construction and purpose will be hereinafter particularly set forth, to arrange for the locking and unlocking of the money-drawer in proper time, with certain other functions on the machine, and, furthermore, effect a certain interdependence and mutuality of action between the locking mechanism for the indicating devices and the money-drawer; and with these ends in view our invention consists in the construction and combination of elements hereinafter fully and in detail set forth, and then recited in the claims.

In order that those skilled in the art to which our invention appertains may fully understand the construction and operation of our improved machine, we will now describe the same in detail, reference being had to the accompanying drawings, which form a part of this specification, and in which—

Figure 2:
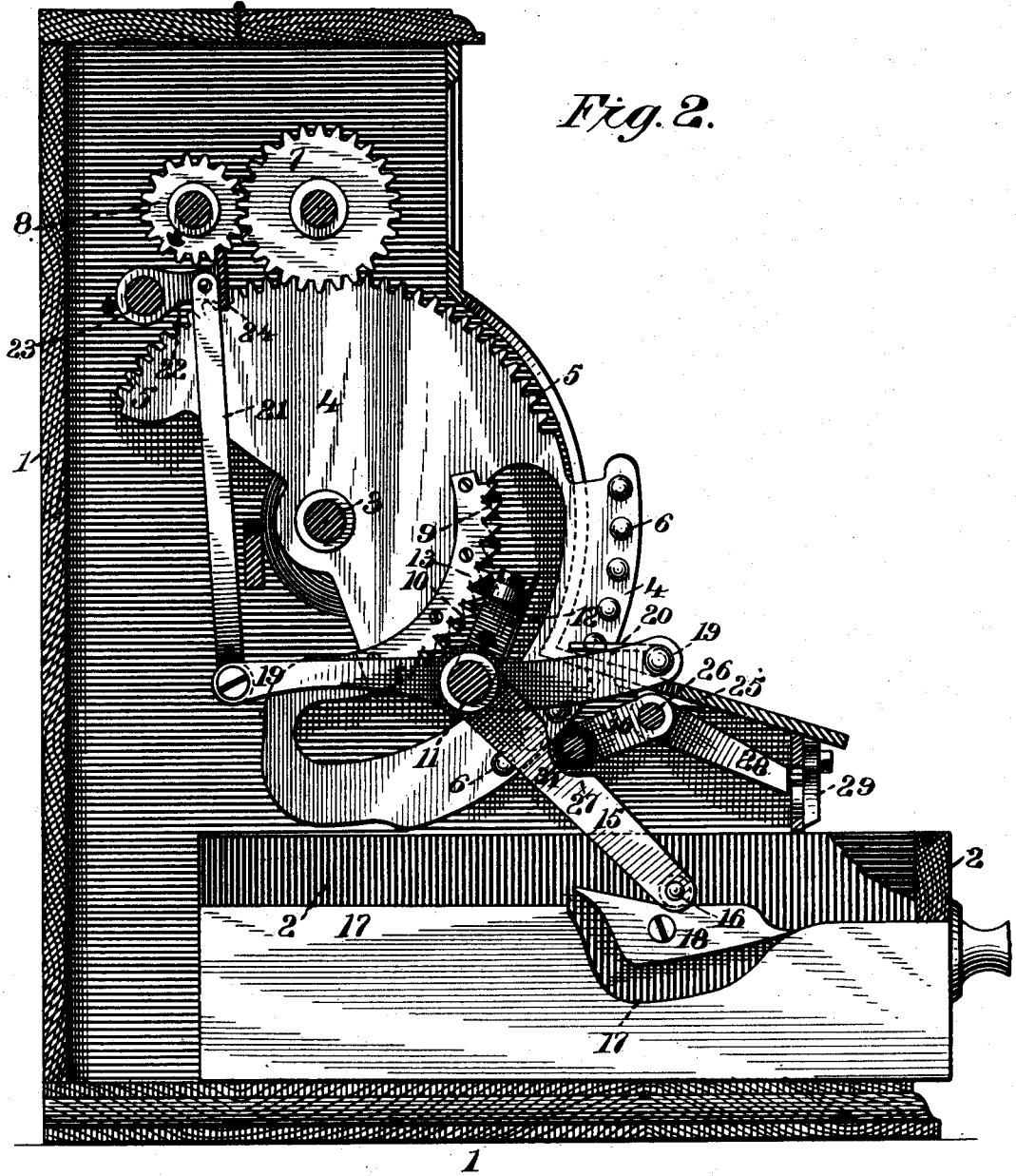
Figure 3:
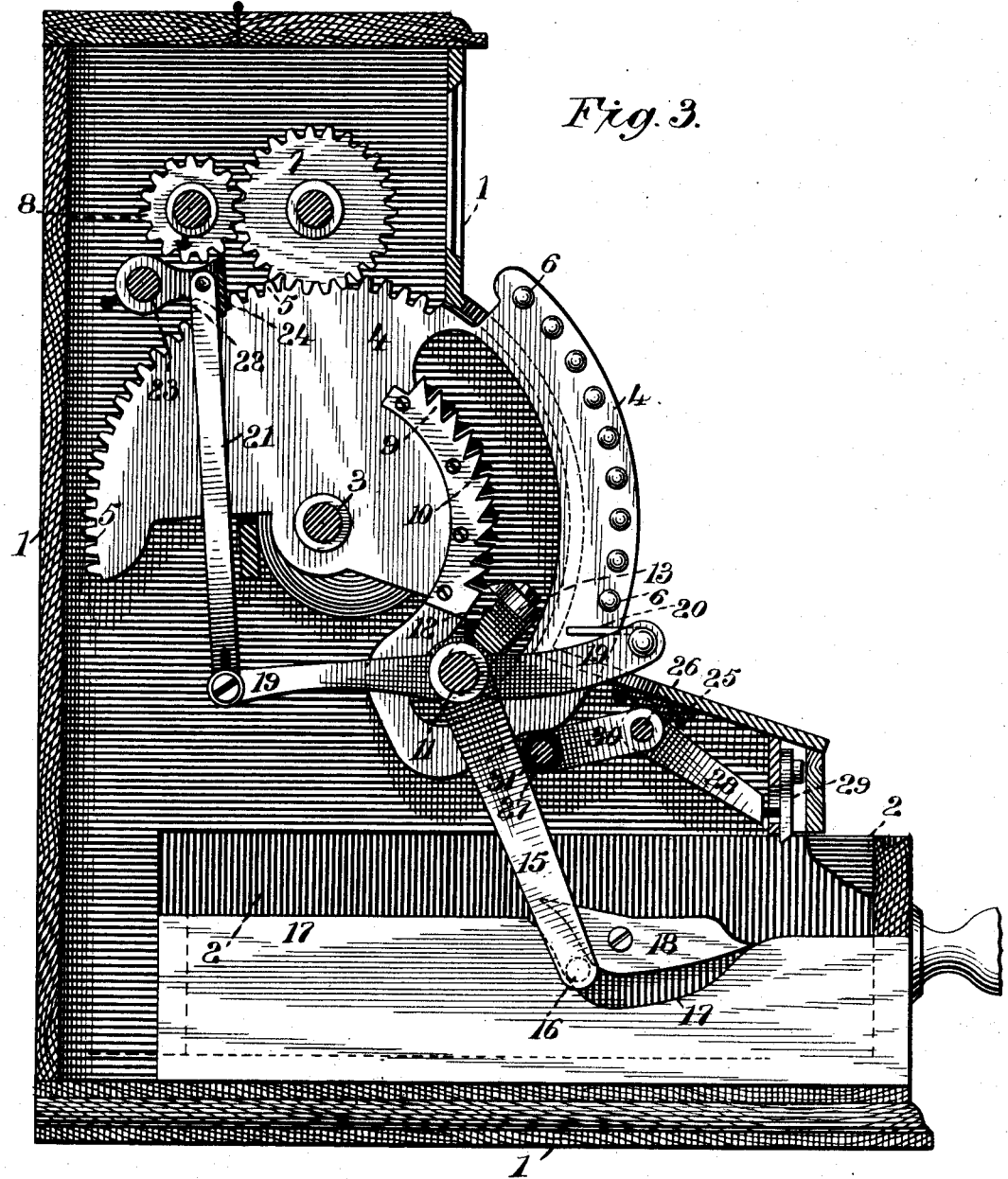
Figure 4:
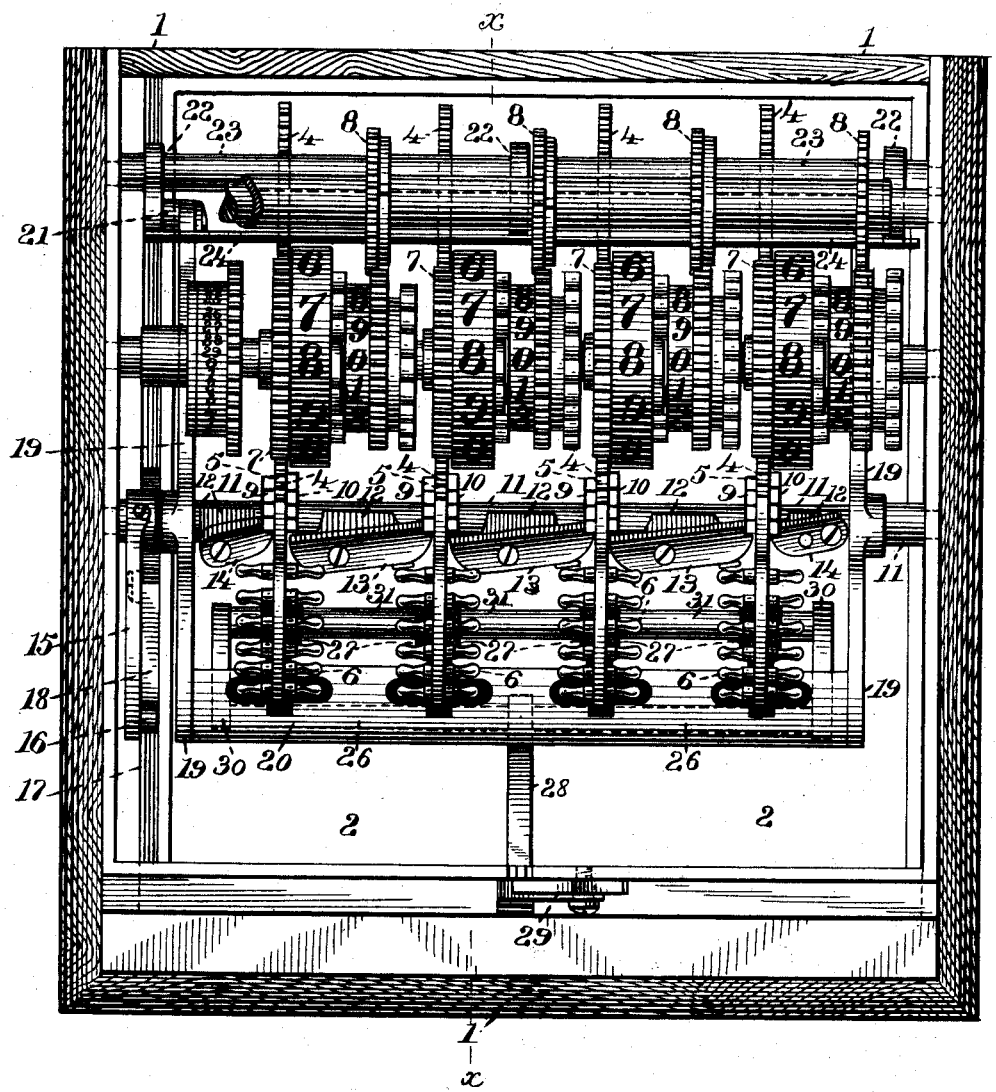
Figure 5:
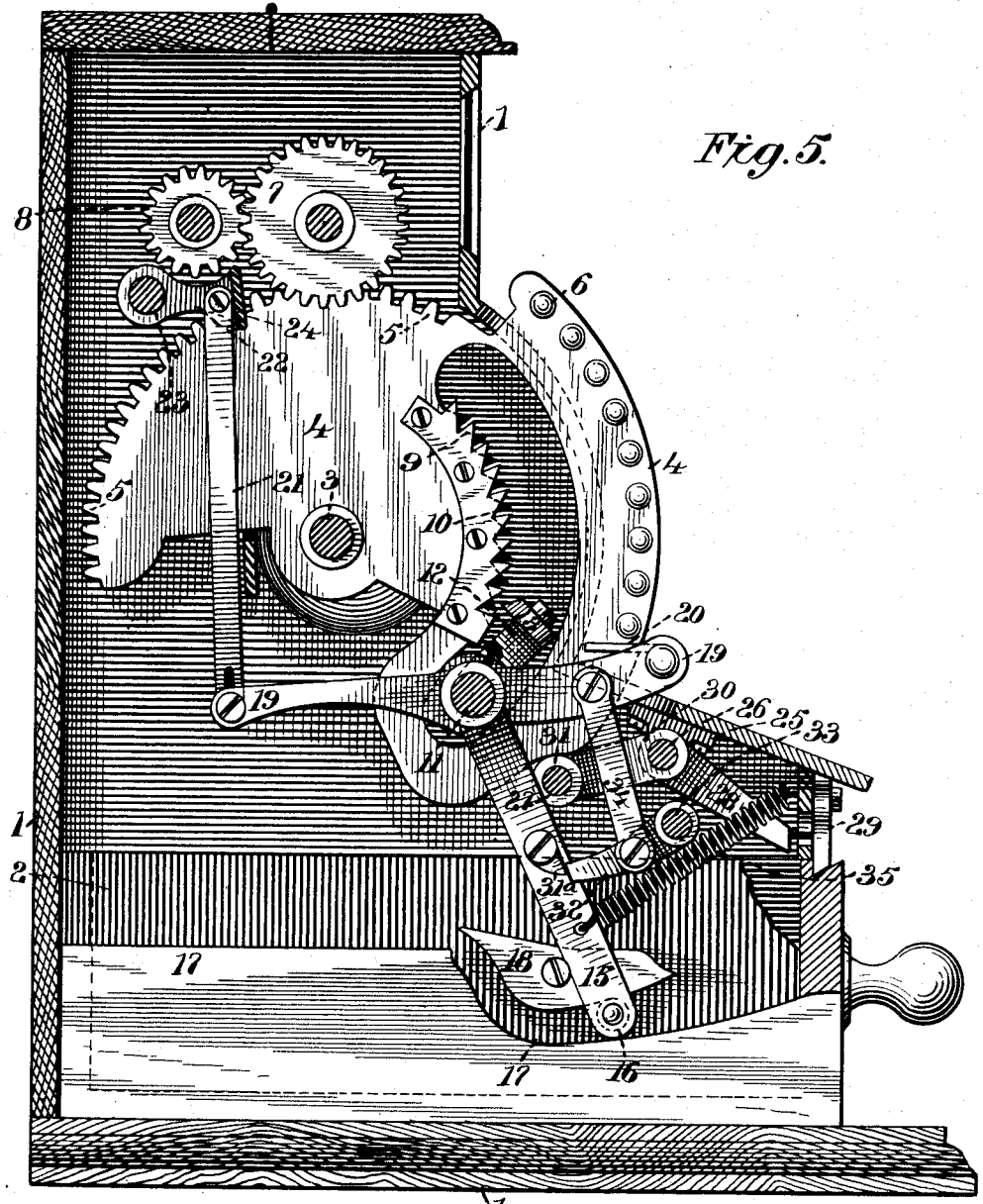
Figure 6:
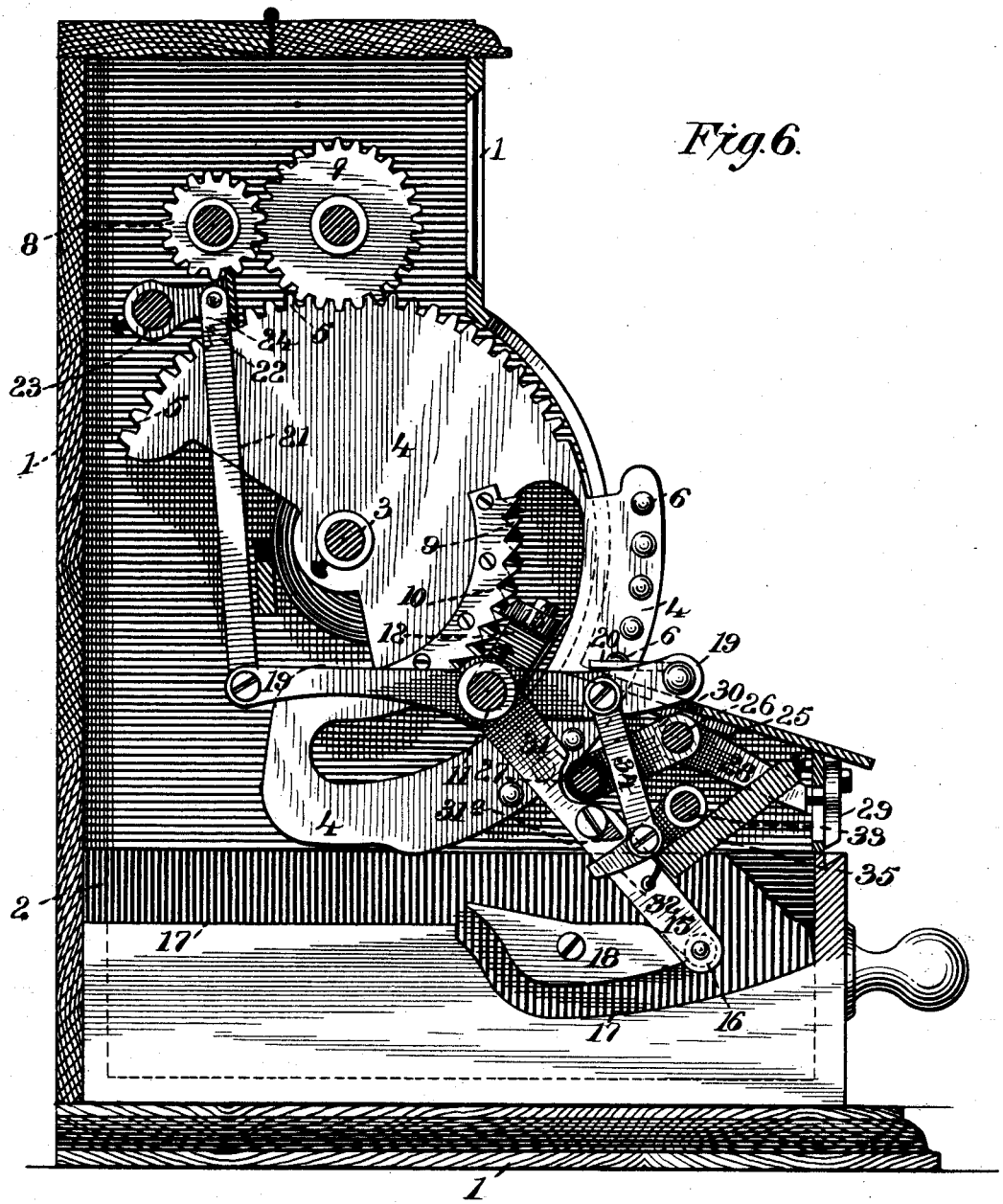

Figure 1 is a vertical section at line *x x* of Fig. 4, the mechanism being shown as at rest; Fig. 2, a similar view, but with one segment depressed and the drawer partially open; Fig. 3, a similar view showing the position of the parts after the drawer has been opened and closed to the extent shown; Fig. 4, a plan view with the top and front of the case removed, all parts shown as at rest; Fig. 5, a view similar to Fig. 1, but showing a modified mechanism for controlling the locking-detents; Fig. 6, a view similar to Fig. 5, but showing the modified mechanism in the position which it assumes after a segment has been depressed.

1 is the case inclosing the working parts of the machine and having the sliding money-drawer 2 in the bottom thereof.

3 is the main shaft, whereon are journaled the pivoted and spring-actuated segments 4 to any desired number, each segment having driving-teeth 5 and operating-handles 6, which are accessible from without the case.

7 are the driven gears on the temporary indicator mechanism, and 8 the transfer-gears.

The parts just recited are, with the exception of the money-drawer, substantially the same in construction and method of operation as the corresponding parts in the application above referred to.

Each of the segments is cut away in the arc of a circle just within the front of the case, and is provided with two sets of inclined locking-teeth 9 10, the former adapted, when engaged by a properly-shaped detent, to lock the segment as against downward movement, and the latter similarly designed to lock said segment as against upward movement. The purpose of this arrangement will presently appear. A shaft 11, having end bearings in the case, extends longitudinally of the latter, and upon arms 12, projecting from said shaft alternately with the segments, are pivoted detents 13 14.

The detents referred to as 13 have an operative face at either end, and each is adapted to engage with two segments. They are pivoted eccentrically, so that one end may be in engagement and the other out of engagement, and any suitable spring (not shown) is employed to retain them normally in the position shown at Fig. 4.

The detents 14 have one operative face only, since they are located at the ends of the machine, and therefore engage one segment only.

Near the end of the shaft 11 is a lever-arm 15, secured to said shaft, so as to rock it on its axis, and the lower end of this lever-arm is provided with a pin or roller stud 16, which engages the top edge of a strip at the side of the money-drawer. Two lever-arms, one at each side, may be used, if required.

The strip is cut away, as seen at 17, and 18 is a pivoted and overbalanced block, which, as will hereinafter more fully appear, operates, after the manner of a switch, upon the lever-arm heretofore described.

19 are levers fulcrumed upon the shaft 11, near its ends, and connected in front by means of a flat plate or strip of metal 20, which forms a key extending across the whole front of the machine. At their rear ends the levers 19 are connected by means of vertical connections 21 to a pair of rock-arms 22 on studs 23, which project from the ends of the machine.

24 is a sharp-edged metal stop secured on the ends of the rock-arms, immediately beneath the peripheries of the gears 8, so that upon suitable upward movement of said rock-arms the edge of said strip will engage between the teeth of said gears, and thereby lock them firmly to prevent their turning.

25 are brackets secured to the inclined portion of the case in front of the segments. In these brackets a shaft 26 is journaled, said shaft carrying upon arms 30 a shaft 31, having thereon a series of rubber rollers 27, one engaging the periphery of each segment.

28 is an arm projecting outward from about the middle of shaft 26, and engaging with its outer end a gravity-latch 29, whose end takes into a recess in the front wall of the drawer. It will be seen that each segment has a slight offset near its lower end. The purpose of this offset is to allow the latch to remain engaged with the drawer so long as all segments are in their zero position; but as soon as any segment is depressed the roller-shaft is pushed downward and outward by the increased diameter of the segment, the shaft 26 rocked slightly in its bearings, and the latch-arm raised sufficiently to lift the latch clear of the drawer.

The operation of our invention is as follows: When a segment is depressed, the inner end of one of the detents, engaging slightly with the upwardly-inclined ratchet-teeth, slides over said teeth, and upon the arrest of the segment will detain it as against return by its spring, as in the pending application hereinbefore referred to. The stoppage of the downward movement of the segment is effected by means of the depression of the key, which extends across the machine, and is common to all the segments. For instance, the units-segment is desired to be depressed to register 7. The fingers are placed upon the 7-handle and the segment turned downward. When the fingers come in contact with the key, the latter is carried slightly downward, and thereby the sharp-edged metal stop is driven into engagement with the teeth of the gears 8, and further movement of any of the parts prevented while said stop is so engaged. The depression of the segment lifts the latch in the manner above described, and leaves the drawer free to be opened. As the drawer is pulled outward the roller on the end of the lever-arm rides up on the top of the pivoted switch-block, which is normally in the position shown at Figs. 1 and 2, and as the top of the block is higher than the plane of that part of the strip upon which said roller normally rests the lever is raised and the shaft 11 rocked in its bearings sufficiently to drive all the detents into full engagement with the segments. Each segment is thereby engaged by the detents from either side, and as each has upwardly-inclined teeth and downwardly-inclined teeth it is securely locked, both as against further downward movement and as to reverse or upward movement. By further outward movement of the drawer the block passes from under the roller on the lever-arm and returns to its normal position by gravity. After the block has thus passed from beneath the lever-arm the latter is supported upon the rear portion of the strip. During all this time the mechanism is locked and the amount of the last sale is shown upon the indicator-wheels through the openings in the case. As the drawer is closed, when the roller on the lever-arm comes to the lever-block it passes beneath the uplifted rear end of the latter, and further closing movement of the drawer by rocking the shaft 11 withdraws all the detents from engagement with the segments, and the latter are then returned to their normal or zero position by the action of the springs, which are the same as in the pending application heretofore referred to. The totalizing-register mechanism has not been referred to herein, since it is the same as in the pending application alluded to before, and, moreover, forms no part of our present invention.

The purpose of the double locking of the segments is to insure the addition to the totalizing-register of the sum caused to appear on the temporary indicator by the movement of one or more segments, and to prevent the possibility of any backward movement of the segments while the drawer is open or any independent movement of the registering mechanism, so as to create a discrepancy between the sum indicated and the amount added to the totalizing-register.

The modification shown in Figs. 5 and 6 shows a means for accelerating the action of the lever-arm, by means of which the locking-detents are controlled. Upon the said lever-arm is pivoted a stop-pawl 31ª, against which, when the drawer is closed and the segments in their zero position, the end of a stop-arm 32 abuts, said stop-arm being pivoted on a short shaft or hub 33 on the inside of the case above the drawer. A link 34 connects the stop-arm to one of the levers 19. A spring 35 has its ends connected, respectively, to the lever-arm and to a fixed point inside the case. This mechanism just described does not in any manner change the principle, but only results in a quicker action of certain of the parts. When thus constructed and arranged, the strip at the side of the drawer is cut away in front to a somewhat greater degree than as shown at Figs. 1, 2, and 3, and the normal position of the lever-arm is with its end beneath the switch-block, as seen at Fig. 5, instead of upon said block at the rear end of the latter. The spring at this time is slightly strained. Upon the depression of a segment and the downward movement of the stop-key the stop-arm is carried past and out of engagement with the stop-pawl, thereby releasing the lever-arm and permitting the spring to pull said arm quickly backward to the position shown at Fig. 6, whereby the partial engagement of the detents with the locking-teeth is effected and the lever-arm held in such position that the outward movement of the drawer will cause said arm to ride upon and over the block onto the higher plane of the strip, whereby the detents are driven into both sets of locking-teeth to their full depth and there retained until the closing movement of the drawer, when the lever-arm passes under the switch-block to the position shown at Fig. 5, and is there detained by the re-engagement of the stop-pawl and stop-lever.

We claim—

1. The combination, with the segments and the mechanism operated thereby, of the sets of teeth inclined in opposite directions and secured to said segments, the detents inclined relative to the face-line of the locking-teeth, means for carrying said detents inward into partial engagement with said teeth, and additional means for driving them into full engagement as to both ends, substantially as set forth.

2. The combination, in a machine of the character described, with the segments and the mechanism operated thereby, of the double sets of locking-teeth inclined in opposite directions secured upon said segments, the transverse shaft parallel with the locking-teeth, the detents carried and controlled by the shaft, the money-drawer, and means operated from the money-drawer whereby the axial position of the detent-shaft is controlled, substantially as specified.

3. In a machine of the character described, the combination, with the segments provided with operating-handles and the mechanism operated thereby, of a key adjacent to said segments and in the path of the hand operating them or either of them, and locking mechanism controlled by said key and adapted, upon the depression thereof, to lock the mechanism of the machine, substantially as specified.

4. In a machine of the character described, the combination, with the segments and the mechanism thereby operated, of the transversely-extended key adjacent and common to all the segments, levers projecting inwardly from said key, and a locking element adjacent to one or more gears of the machine and adapted to be thrown into or out of engagement therewith, according as the key is in its depressed or normal position, substantially as specified.

5. In a machine of the character described, the combination, with the segments and the mechanism operated thereby, of the transversely-extended key adapted to be engaged and depressed by the fingers of the operator, the levers extending backward from said key, the stop-strip adjacent to the gears 8, and a suitable connection between the levers and the strip for the operation of the latter by the former, substantially as described.

6. In a machine of the character described, the combination, with the segments and the mechanism thereby operated, of locking-teeth upon said segments, the detents arranged adjacent to the locking-teeth, a lever-arm connected to and adapted to control the position of the detents, the drawer, and a switch carried by the drawer and engaging the lever-arm, whereby the lever-arm is operated, substantially as set forth.

7. In a machine of the character described, the combination, with the segments, the detents, and the lever-arm, of a pivoted switch secured to the drawer and adapted to govern the position of the arm and detents during the opening and closing of the drawer, substantially as specified.

8. In a machine of the character described, the combination, with the indicating mechanism and the segments for operating the same, of the detents, the lever-arm whereby the position of said detents is controlled, the strip upon the drawer upon which the lower end of the lever-arm bears, and the eccentrically-pivoted switch-block secured upon the drawer and adapted to vary the position of the lever-arm, substantially as specified.

9. In a machine of the character described, the combination, with the segments, each provided with an offset in its periphery, of a rock-shaft having connected thereto rollers engaging the peripheries of the several segments, and a latch taking into the drawer and adapted to be withdrawn by the downward movement of either of the segments, substantially as specified.

10. The combination, with the segments, each provided with an offset in its periphery, of a series of rollers operating together and engaging said segments, a rock-shaft whose position is determined by the relation of the rollers to the segments or either of them, and a lock operated by the rock-shaft, substantially as and for the purpose specified.

In testimony whereof we affix our signatures in presence of two witnesses.

FREDERICK L. FULLER.
GEORGE H. GRISWOLD.

Witnesses:
S. H. HUBBARD,
WM. J. TANNER.